US005773405A

United States Patent [19]

Bruhnke

[11] Patent Number: 5,773,405
[45] Date of Patent: *Jun. 30, 1998

[54] CLEANER COMPOSITIONS CONTAINING SURFACTANT AND POLY (OXYALKYLENE)-SUBSTITUTED REACTIVE DYE COLORANT

[75] Inventor: John D. Bruhnke, Spartanburg, S.C.

[73] Assignee: Milliken Research Corporation, Spartanburg, S.C.

[ * ] Notice: The term of this patent shall not extend beyond the expiration date of Pat. No. 5,770,552.

[21] Appl. No.: 816,083

[22] Filed: Mar. 13, 1997

[51] Int. Cl.$^6$ .............................. C11D 17/00; C11D 3/00; C11D 3/40; D06P 5/13
[52] U.S. Cl. ......................... 510/519; 510/180; 510/276; 510/461; 510/527; 8/403; 8/647
[58] Field of Search .................. 8/403, 647; 510/180, 510/191, 214, 217, 220, 235, 238, 343, 419, 527

[56] References Cited

U.S. PATENT DOCUMENTS

| | | | |
|---|---|---|---|
| 3,157,633 | 11/1964 | Kuhn | 260/200 |
| 3,819,324 | 6/1974 | Bino | 8/164 |
| 4,167,510 | 9/1979 | Brendle | 260/174 |
| 4,284,729 | 8/1981 | Cross et al. | 521/158 |
| 4,316,824 | 2/1982 | Pancheri | 252/551 |
| 4,468,255 | 8/1984 | Schwart et al. | 106/288 |
| 4,634,555 | 1/1987 | Baxter et al. | 540/126 |
| 4,703,113 | 10/1987 | Baxter et al. | 534/796 |
| 4,726,844 | 2/1988 | Greenwood | 106/22 |
| 4,732,570 | 3/1988 | Baumgartner et al. | 8/506 |
| 4,738,721 | 4/1988 | Baxter et al. | 106/22 |
| 4,777,248 | 10/1988 | Greenwood | 534/803 |
| 4,871,371 | 10/1989 | Harris | 8/403 |
| 5,061,393 | 10/1991 | Linares et al. | 252/143 |
| 5,089,162 | 2/1992 | Rapisarda et al. | 252/102 |
| 5,176,745 | 1/1993 | Moore et al. | 106/22 |
| 5,240,464 | 8/1993 | Kluger et al. | 8/506 |
| 5,240,980 | 8/1993 | Danielson et al. | 524/190 |
| 5,250,708 | 10/1993 | Barry, Jr.k | 549/225 |
| 5,271,868 | 12/1993 | Azechi et al. | 252/358 |
| 5,300,667 | 4/1994 | Kasprzak et al.k | 556/437 |
| 5,376,301 | 12/1994 | Fleuren et al.k | 252/174.15 |
| 5,378,387 | 1/1995 | Houghton et al. | 252/174.21 |
| 5,378,409 | 1/1995 | Ofosu-Asante | 252/548 |
| 5,380,452 | 1/1995 | Blanvalet et al. | 252/117 |
| 5,382,376 | 1/1995 | Michael et al. | 252/153 |
| 5,384,063 | 1/1995 | Woo et al. | 252/142 |
| 5,385,696 | 1/1995 | Repinec, Jr. et al. | 252/546 |
| 5,387,373 | 2/1995 | Naik | 252/546 |
| 5,387,375 | 2/1995 | Erilli et al. | 252/546 |
| 5,389,282 | 2/1995 | Saijo et al. | 252/174.17 |
| 5,389,284 | 2/1995 | van der Hoeven et al. | |
| 5,389,305 | 2/1995 | Repinec et al. | 252/546 |
| 5,391,316 | 2/1995 | Garrett et al. | 252/126 |
| 5,393,468 | 2/1995 | Erilli et al. | 252/550 |

FOREIGN PATENT DOCUMENTS

| | | | |
|---|---|---|---|
| 0 176 195 | of 0000 | European Pat. Off. | C09B 29/30 |
| 0 187 520 | of 0000 | European Pat. Off. | C09B 43/16 |

OTHER PUBLICATIONS

Sela et al., "Newly designed polysiloxane–graft–poly(oxyethylene) copolymeric surfactants: preparation, surface activity and emulsification properties," Colloid Polym Sci 272:684–691 (1994).

Ni et al., "Synthesis of a Novel Polysiloxne–based Polymer Electrolyte and its Ionic Conductivity," Polymers for Advanced Technologies, vol. 4, pp. 80–84 (1993).

*Primary Examiner*—Paul Lieberman
*Assistant Examiner*—John M. Petruncio
*Attorney, Agent, or Firm*—Terry T. Moyer; William S. Parks

[57] ABSTRACT

The present invention relates to a surface cleaner composition comprising:
1) from 0.1 to 70% of tensoactive, or mixtures thereof;
2) from 0 to 95% builder/softener;
3) from 0 to 99.9% solvent;
4) from 0 to 50% hydrotrope; and
5) from 1 to 5000 ppm of a poly(oxyalkylene)-substituted colorant which is liquid in its undiluted state having the structure ABXYZ, where AB is a reactive dye moiety wherein
A is an organic chromophore;
B is and electrophilic reactive group covalently bonded to A directly or through a linking group;
X is a nucleophilic linking group covalently bonding B and Y, selected from the group consisting of NR, O, S, and 4-oxyanilino (—HN—Ph—O—); where R is selected from the group consisting of H, alkyl, aryl, and YZ;
Y is a poly(oxyalkylene)-containing moiety; and
Z is a terminal group for Y.

18 Claims, No Drawings

CLEANER COMPOSITIONS CONTAINING SURFACTANT AND POLY (OXYALKYLENE)-SUBSTITUTED REACTIVE DYE COLORANT

BACKGROUND OF THE INVENTION

This invention is directed to cleaner compositions for hard surfaces containing a surfactant component and a poly(oxyalkylene)-substituted colorant, and the use of such compositions for cleaning soiled surfaces. More particularly, this invention relates to a cleaner composition comprising a colorant made from a reactive dye having an electrophilic reactive group reacted with a poly(oxyalkylene)-containing moiety having a nucleophilic reactive group.

Surface cleaner compositions are provided as colored formulations for aesthetic reasons and brand identity. Although white surface cleaner compositions and colorless cleaner solutions have long been commercially accepted, the modern consumer often prefers attractively colored products.

Generally, the small proportion of colorant in the ultimate cleaner composition is insufficient to color materials being washed and dye stains are not a serious problem. However, certain materials may be discolored during cleaning or take on a colored cast after repeated contacts with the same cleaner product and contacts with the colorants contained therein, especially where concentrated solutions or pastes of colored surface cleaner compositions are applied to stainable surfaces, e.g., porous ceramics, etc.

Organic chromogens containing poly(oxyalkylene) substituents are disclosed in Kuhn, U.S. Pat. No. 3,517,633, Brendle, U.S. Pat. No. 4,167,510, Cross et al., U.S. Pat. No. 4,284,729, Baumgartner et al., U.S. Pat. No. 4,732,570, Moore et al., U.S. Pat. No. 5,176,745, Kluger et al., U.S. Pat. No. 5,240,464, and Barry, U.S. Pat. No. 5,250,708. Poly(oxyalkylene) substituted colorants made by modifying pigment are disclosed in Schwartz et al., U.S. Pat. No. 4,468,255.

Several patents and published applications assigned to ICI relate to poly(alkylene oxide)-substituted reactive dyes, for example, Baxter et al, U.S. Pat. No. 4,634,555; Baxter et al, U.S. Pat. No. 4,703,113; Greenwood et al, U.S. Pat. No. 4,726,844; Baxter et al, U.S. Pat. No. 4,738,72 1; Greenwood, U.S. Pat. No. 4,777,248; EP-A 0176195 to Baxter et al.; EP-A 0187520 to Greenwood.

The relatively low molecular weights of the poly(oxyalkylenes) required by the ICI art result in dyes which exhibit a high stain factor for many substrates. Moreover, the resulting dyes are solids which must be dissolved in a suitable solvent for most uses.

Polydimethylsiloxanes prepared as copolymers with alkylene oxides are widely used as surfactants. Altering the amounts of alkylene oxide (hydrophile) and dimethylsiloxane (lipophile) affects surfactant properties. The higher the alkylene oxide content the higher the hydrophilicity. Materials with ethylene oxide contents 75% and higher are freely soluble in water and low molecular weight copolymers can be used as wetting agents, anti-foggers, anti-foamants, and slip agents in inks.

Efforts have been made to discover cleaner compositions and dyes for coloring them which, even when subjected to adverse conditions, as when applied in concentrated form to a normally reactive substrate, will not result in objectionable coloration of the substrate. The present cleaner compositions, colored with the colorants of the present invention, allow for the manufacture of attractively colored cleaners and generally do not stain the surfaces cleaned. Colorants employed in cleaner compositions are preferably those which are easily removed from the cleaned surface if dye staining occurs. Colorants of high color stability in cleaner compositions which exhibit minimal complexation or reaction with the surfaces being cleaned and which are high pH stable are of particular interest. It is advantageous that they also provide high color loading and bright coloration.

For liquid surface cleaner compositions, it is desirable to provide colorants which are non-toxic, color stable, non-staining, and capable of high color loading and bright coloration without precipitating out of the composition.

SUMMARY OF THE INVENTION

The present invention relates to a surface cleaner composition comprising a tensoactive, a builder/softener, solvent, hydrotrope, and a colorant, wherein the colorant is the reaction product of a reactive dye and a poly(oxyalkylene)-containing polymer having a nucleophilic reactive group. The poly(oxyalkylene)-containing polymer is preferably comprised of 3 to 100 alkylene oxide residues selected from the group consisting of ethylene oxide and propylene oxide.

The present invention also relates to a surface cleaner composition comprising:

1) from 0.1 to 70% of tensoactive, or mixtures thereof;
2) from 0 to 95% builder/softener;
3) from 0 to 99.9% solvent;
4) from 0 to 50% hydrotrope; and
5) from 1 to 5000 ppm of a poly(oxyalkylene)-substituted colorant having the structure ABXYZ, where A is an organic chromophore;

B is an electrophilic reactive group covalently bonded to A directly or through a linking group;

X is a nucleophilic linking group covalently bonding B and Y, selected from the group consisting of NR, O, S, and 4-oxyanilino (—HN—Ph—O—); where R is selected from the group consisting of H, alkyl, aryl, and YZ;

Y is a poly(oxyalkylene)-containing moiety; and

Z is a terminal group for Y.

Such general purpose cleaner formulations can further include 0.01 to 25% pH adjusters, 0 to 50% abrasives, and 0.01 to 25% other additives such as thickeners, opacifiers, bleaching agents, preservatives, and perfumes.

DETAILED DESCRIPTION OF THE INVENTION

Without limiting the scope of the invention, the preferred embodiments and features are hereinafter set forth. Unless otherwise indicated, all parts and percentages are by weight and conditions are ambient, i.e. one atmosphere of pressure and 25° C. Unless otherwise specified, aliphatic hydrocarbons are from 1–12 carbon atoms in length.

All of the U.S. patents disclosed in this specification are incorporated herein by reference in their entirety.

Formulations of suitable surface cleaner compositions of the present invention include both granular (powdered) compositions, gel compositions and liquid compositions.

Tensoactives

Tensoactives are present in the composition of the present invention in order to improve the ability of the cleaner to clean or remove soil, and may also function as suds boosters.

Suitable tensoactives include nonionic surfactants, anionic surfactants, amphoterics, and zwitterionic surfactants. Among the nonionic surfactants included are ethoxylated or propoxylated fatty alcohols and acids, ethoxylated or propoxylated, alkyl phenols, fatty acid amides such as diethanolamides, polyoxyethylene-polyoxypropylene block copolymers, and silicone glycols. Anionic surfactants include alkylbenzene, toluene, xylene, or naphhalene sulfonates, alkyl sulfonates and sulfates, fatty ether sulfates, ammonium ethoxysulate, sodium ethoxysulfate, phosphate esters, alkyl and alkenyl caboxylic acids, and fatty acids (and their salts). Suitable amphoterics include mixed $C_8$ amphocarboxylates, cocoamphocarboxyglycinate, and cocoamphopropionate. Suitable zwitterionics include betaines, such as cocamidopropyl betaine.

Builders/Softeners

Builders/softeners can be present in the cleaner compositions of the present invention in order to help control water hardness and aid in soil anti-redeposition and suspension. Such materials include tripolyphosphates, pyrophosphates, orthophosphates, nitrilotriacetates, citrates, citric acid, carbonates, bicarbonates, sesquicarbonates, borates, zeolites, silicates, urea, ethylenediaminetetraacetic acid (EDTA) (and salts), carboxymethylcellulose, hydroxyethylcellulose, phytates, polyphosphonates, oxydisuccinates, oxydiacetates, carboxymethyloxy succinates, tetracarboxylates, starch, oxidized heteropolymeric polysaccharides, polymeric polycarboxylates such as polyacrylates, and polyacetal carboxylates.

Solvents

Solvents may be added to the present invention compositions as a solubilizing agent. Suitable solvents include lower alcohols, such as ethanol, methanol, and isopropanol, ethylene glycol monobutyl ether, propylene glycol monomethyl ether, dipropylene glycol monomethyl ether, propylene glycol, o-benzyl-4-chlorophenol, deodorized kerosene, odorless mineral spirits, pine oil, N-methyl-2-pyrrolidone, wax, d-limonene, methylglycol, terpentinoil, and white spirits.

Hydrotropes

Hydrotropes increase the solubility in water of another material, which is only partially soluble. Suitable hydrotropes which may be present in the composition of the present invention include sodium xylene, toluene, and naphthalene sulfonates, lower alcohols, such as ethanol or isopropanol, and calcium chelating agents such as bis(2-ethanol)glycine, N-(2-hydroxyethyl)iminodiacetic acid, N-(2,3-dihydroxypropyl) iminodiacetic acid, and their alkali metal salts.

pH Adjuster

Additives for pH adjustment suitable for inclusion in the present invention compositions include alkali metal hydroxides, ammonium hydroxide, acetic acid, citric acid, phosphoric acid, tetrapotassium pyrophosphate, tetrasodium pyrophosphate, potassium dihydrogenphosphate, sodium dihydrogenphosphate, monoalkanolamines, dialkanolamines, and trialkanolamines.

Abrasives

Suitable abrasives can be any of a wide variety of natural or synthetic substances used to smooth, scour, rub away, polish or scrub. Such materials include calcium carbonate, silica, sodium carbonate, calcite, feldspar, quartz, pumice, sand, clay, and silicates.

Specific Applications

Specific applications for the present invention compositions include hard surface cleaners, floor cleaner/wax stripper formulations, glass/window cleaners, bathroom cleaners, dishwashing detergents, and automatic dishwashing detergents.

Hard Surface Cleaners

Generally, hard surface cleaner compositions of the present invention can comprise 1) from 2 to 60% of tensoactive, or mixtures thereof;

2) from 0 to 40% builder/softener;

3) from 0 to 35% solvent;

4) from 0 to 50% hydrotrope; and 5) from 1 to 5000 ppm of a poly(oxyalkylene)-substituted colorant having the structure ABXYZ as described above.

Optionally, the hard surface cleaner formulations may contain 0.01 to 25% pH adjusters and 0.01 to 25% other additives such as thickeners, flow control agents (granular), opacifiers such as latex, soil-suspending agents, anti-redeposition agents, calcium ions, anti-tarnish agents, enzymes, thickeners, clay, silicates, preservatives, and perfumes. Examples of hard surface cleaner compositions suitable for the present invention (except for colorant) and their preparation are disclosed in U.S. Pat. No. 5,378,387 to Houghton et al., U.S. Pat. No. 5,380,452 to Blanvalet et al., U.S. Pat. No. 5,382,376 to Michael et al., U.S. Pat. No. 5,389,282 to Saijo et al., U.S. Pat. No. 5,389,284 to van der Hoeven, U.S. Pat. No. 5,391,316 to Garrett et al., and U.S. Pat. No. 5,393,468 to Erilli et al.

Floor Cleaners/Wax Strippers

Floor cleaner/wax stripper formulations of the present invention can comprise 1) from 1 to 20% of tensoactive, or mixtures thereof;

2) from 0 to 35% builder/softener;

3) from 0 to 40% solvent;

4) from 0 to 10% hydrotrope; and 5) from 1 to 5000 ppm of a poly(oxyalkylene)-substituted colorant having the structure ABXYZ as described above. Optionally, the hard surface cleaner compositions may contain 0.01 to 25% pH adjusters and 0.01 to 25% other additives such as thickeners, opacifiers, preservatives, and perfumes.

Glass/Window Cleaners

Glass/window cleaner formulations of the present invention can comprise 1) from 0.1 to 15% of tensoactive, or mixtures thereof;

2) from 0 to 99.9% solvent;

3) from 0 to 5% pH adjuster;

4) from 0 to 99.9% water; and 5) from 1 to 5000 ppm of a poly(oxyalkylene)-substituted colorant having the structure ABXYZ as described above. Optionally, the glass/window cleaner compositions may contain 0.01 to 10% perfumes as well as 0.01 to 10% of other cleaners such as silica, sodium metasilicate pentahydrate, and sodium gluconate.

Bathroom Cleaners

Bathroom cleaner compositions of the present invention can comprise 1) from 1 to 20% of tensoactive, or mixtures thereof;

2) from 0 to 15% builder/softener;

3) from 0 to 10% solvent;

4) from 0 to 20% hydrotrope; and 5) from 1 to 5000 ppm of a poly(oxyalkylene)-substituted colorant having the structure ABXYZ as described above. Optionally, the hard surface cleaner compositions may contain 0 to 35% abrasives, 0.01 to 25% pH adjusters and 0.01 to 25% other additives such as thickeners, opacifiers, bleaching agents, preservatives, and perfumes.

Bathroom cleaners which can be used in the present invention (except for colorant) and their preparation are disclosed in U.S. Pat. No. 5,061,393 to Linares et al. and U.S. Pat. No. 5,384,063 to Ah-Man Woo et al.

Light Duty Liquid Dishwashing Detergents

Light duty liquid (hand) dishwashing detergent compositions of the present invention can comprise 1) from 5 to 70% of tensoactive, or mixtures thereof;

2) from 0 to 15% builder/softener;

3) from 0 to 10% hydrotrope; and 4) from 1 to 5000 ppm of a poly(oxyalkylene)-substituted colorant having the structure ABXYZ as described above. Preferably, the tensoactive component includes zwitterionic surfactants, e.g., betaine. Optionally, the dishwashing detergent compositions may contain 0.01 to 25% pH adjusters, 0.01 to 10% perfumes and 0.01 to 25% other additives such as thickeners, opacifiers, bleaching agents, and preservatives.

Examples of dishwashing detergent compositions (except for colorant) suitable for the present invention and their preparation are disclosed in U.S. Pat. No. 4,316,824 to Pancheri, U.S. Pat. No. 5,378,409 to Ofosu-Asante et al., U.S. Pat. No. 5,385,696 to Repinec, Jr. et al., U.S. Pat. No. 5,387,373 to Naik, U.S. Pat. No. 5,387,375 to Erilli et al., and U.S. Pat. No. 5,389,305 to Repinec et al.

Automatic Dishwashing Detergent

Automatic dishwashing detergent compositions of the present invention can comprise 1) from 0.1 to 10% of tensoactive, or mixtures thereof;

2) from 5 to 90% builder/softener;

3) from 1 to 40% silicate; and 4) from 1 to 5000 ppm of a poly(oxyalkylene)-substituted colorant having the structure ABXYZ as described above.

The tensoactive component providing the ability to clean or remove soil is a low-foam or defoaming agent selected from nonionic surfactants and anionic surfactants. Suitable nonionic surfactants include ethoxylated or propoxylated fatty alcohols and acids, ethoxylated or propoxylated alkyl phenols, ethoxylated derivatives of sorbitan, mono-, di-, and tri-fatty acid esters, fatty acid amides, and polyoxyethylene-polyoxypropylene block polymers. Suitable anionic surfactants include alkyl benzene sulfonates and sulfates, alkyl sulfonates and sulfates, amine oxides, phosphine oxides, sulfoxides, betaines, and mono- or di- $C_{8-14}$ alkyl diphenyl oxide mono- or di-sulfonates and sulfates.

Bleaching agents are added to provide whitening and cleaning properties. These agents include halogen donating bleaching agents (0.01–5% active Cl) such as heterocyclic N-halo imides; di- and trihalocyanuric acids and their salts; N-chlorinated succinimide, malonimide, phthalimide, and naphthalimide; hydantoins, e.g., 1,3-dihalo-5,5-dimethylhydantoin; lithium hypochlorite; sodium hypochlorite; calcium hypochlorite; chlorinated trisodium phosphate; and sodium and potassium dichloroisocyanurate dihydrate. Oxygen bleaching agents may also be used as bleaching agents in amounts of 0.5–20%. Such agents include percarbonates, perborates, persulfates, and dipersulfates along with activators in amounts of 0.5–30% of total detergent content. These activators may be selected from tetraacetylethylenediamine, sodium benzoyloxybenzene sulfonate, choline sulfophenyl carbonate, Mn or other transition metal catalyst, diperoxy dodecanedioic acid, and lauroyl peroxide.

Builders are used in automatic dishwashing detergent compostions to control water hardness (i.e., $Ca^{2+}$, $Mg^{2+}$), and aid in soil anti-redeposition and suspension. Such materials include tripolyphosphates, pyrophosphates, orthophosphates, nitrilotriacetates, citrates, citric acid, carbonates, bicarbonates, sesquicarbonates, borates, zeolites, phytates, polyphosphonates, oxydisuccinates, oxydiacetates, carboxymethyloxy succinates, tetracarboxylates, starch, oxidized, heteropolymeric polysaccharides, and polymeric polycarboxylates, such as polyacrylates and polyacetal carboxylates.

Silicate components are cleaning ingredients which provide a source of alkalinity, inhibit metal corrosion, and protect the glaze on china tableware. Suitable silicates include sodium or potassium silicate.

Fillers are used as inert filler material in granular compositions. Such materials include sucrose, sucrose esters, urea, sodium sulfate, sodium chloride, and potassium chloride.

Thickeners are used in liquid and gel formulations to enhance thixotropic properties. Such materials include smectite clays such as montmorillonite (bentonite), hectorite, and saponite; silica, silica gel, aluminosilicates, salts of polyacrylic acid, natural gums and resins.

Stabilizers impart stability to the detergent formulation and include long chain calcium and sodium soaps and sulfates.

Defoamers are antifoaming agents which prevent unwanted sudsing in automatic dishwashers. Such materials include mono- and distearyl acid phosphate, silicone oil, and mineral oils.

The automatic dishwashing detergent compositions of the present invention may contain conventional amounts of other commonplace detergent formulation additives including flow control agents (for granular formulations), soil-suspending agents, anti-redeposition agents, anti-tarnish agents, enzymes, pH adjustment additives, and perfumes, as above-described.

Typical granular automatic dishwashing detergent compositions of the present invention can comprise 1) from 0.1 to 10% of tensoactive, or mixtures thereof;

2) from 5 to 90% builder/softener;

3) from 1 to 40% silicate;

4) from 1 to 5000 ppm of a poly(oxyalkylene)-substituted colorant having the structure ABXYZ as described above;

5) from 0 to 5% active Cl bleach; and 6) from 0 to 60% filler.

Typical liquid or gel automatic dishwashing detergent compositions of the present invention can comprise 1) from 0.1 to 5% of tensoactive, or mixtures thereof, 2) from 5 to 90% builder/softener;

3) from 1 to 40% silicate;

4) from 1 to 5000 ppm of a poly(oxyalkylene)-substituted colorant having the structure ABXYZ as described above;

5) from 0 to 5% active Cl bleach;

6) from 0 to 8% thickener;

7) from 0 to 5% stabilizer; and 8) from 0 to 2% defoamer.

Examples of automatic dishwashing detergent compositions (except for colorant) suitable for the present invention and their preparation are disclosed in U.S. Pat. No. 5,089,162 to Rapisarda et al.

All of the surface cleaner compositions of the present invention are prepared by conventional methods. The colorant may be added to the compositions at anytime during preparation.

Typically, the amount of staining imparted to the cleaned surface by the surface cleaner depends on the type of surface being cleaned, the concentration and type of the dye in the surface cleaner composition. The surface cleaner compositions of the invention are substantially non-staining.

Poly(oxyalkylene)-Substituted Colorant

The colorant employed in the present invention comprises a poly(oxyalkylene) substituent. The colorant may be synthesized by the reaction of a reactive dye with the polymer through a linking group. Reactive dyes can be represented as AB and are those dyes comprising an organic chromophore component A which is covalently bonded directly or through a linking group, such as an amino-containing group, to an electrophilic functional group B capable of reacting with a nucleophile to form a covalent bond either by addition or displacement.

Organic Chromophore A

A broad range of reactive dyes has been synthesized and includes those incorporating: azo groups such as monoazo, bisazo, and polyazo including their complexes with Cr, Fe, Co, and Cu; phthalocyanine; anthraquinone; aza [18] annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores. Preferably, the reactive dye incorporates an azo, phthalocyanine or anthraquinone chromophore group.

Electrophilic Functional Group B

The reactive dye moieties AB contain organic chromophore A and at least one electrophilic functional group B. When multiple functional groups are provided, it is often desirable that the groups vary in reactivity, to maximize conversion. Examples of electrophilic functional groups which may be incorporated into the reactive dye include: monohalotriazine; dihalotriazine; monohalopyrimidine; dihalopyrimidine; trihalopyrimidine; dihaloquinoxaline; dihalopyridazone; dihalophthalazine; halobenzothiazole; mono-(m-carboxypyridinium)-triazine; amino epoxide; methylamino; sulfatoethyl sulfone; sulfatoethyl sulfonamide; chloroethyl sulfone; vinyl sulfone; phenylamino sulfone; acrylamide; alpha-haloacryloylamide; alpha, beta-dihalopropionyl amide; halosulfonyl pyrimidine; sulfatoethylamino sulfone; sulfatopropionamide; halosulfothiazinylamide and haloacetylamide. The halo component may be selected from fluorine, chlorine and bromine. Preferably, the reactive dye incorporates an electrophilic functional group selected from monochlorotriazine, monofluorotriazine, dichlorotriazine, sulfatoethyl sulfone, vinyl sulfone, 2,3-dichloroquinoxaline, and 2,4-difluor-5-chloropyrimidine groups.

Reactive dyes meeting the above description are commercially available, described in the Colour Index, 3rd Edition, the Society of Dyers and Colourists (1971) and in the available published literature. By way of example and not limitation, the following reactive dyes may be employed: C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C.I. Reactive Yellow 17, and C.I. Reactive Yellow 95.

Nucleophilic Linking Group X

The poly(oxyalkylene)-containing substituent Y is covalently bonded to the electrophilic group B of reactive dye AB through X, a nucleophilic linking group selected from the group consisting of NR, O, S, and 4-oxyanilino (—HN—Ph—O—); where R is selected from the group consisting of H, alkyl, aryl, and YZ. Two poly(oxyalkyene)-containing substituents may be bonded to reactive dye AB through a linking group comprising a trivalent atom, e.g., N. The number of poly(oxyalkylene) chains per chromophore may be from 1–6, preferably 1–4, most preferably 1, 2 or 3.

Poly(oxyalkylene)-Containing Substituent Y

Y can be a poly(oxyalkylene)-containing moiety comprising the formula $(C_aH_{2a}O)_m(C_bH_{2b}O)_n$ where a and b are different and from 1 to 8, preferably from 1 to 4, e.g., a is 2, b is 3, m is at least 3, preferably at least 11, e.g., where lower staining factor of the resulting colorant composition is desired; n is 0 to 15, e.g., 0 or 1. The molecular weight of the Y moiety can be less than 4000 and can range from 130 to 4000, preferably from 480 to 4000.

Typical of such Y substituents are poly(oxyalkylene) polymers and copolymers. Polymeric substituents are preferred. In this regard, polyalkylene oxides and copolymers of same which may be employed to provide the colorant of the present invention are, without limitation, polyethylene oxides, polypropylene oxides, polybutylene oxides, copolymers of polyethylene oxides, polypropylene oxides and polybutylene oxides, and other copolymers including block copolymers, in which a majority of the polymeric substituent is polyethylene oxide, polypropylene oxide and/or polybutylene oxide. While such substituents generally have an average molecular weight in the range of from 130 to 4000, say, 130 to 1400, they should not be so limited.

Polysiloxane-Poly(oxyalkylene) Copolymer

In a particular embodiment of the present invention, Y can be described as a polysiloxane-poly(oxyalkylene) copolymer which incorporates (a) a polysiloxane segment characterized by a —Si($R^1$)($R^2$)O— repeating group wherein $R^1$ and $R^2$ are each selected from the group consisting of alkyl, phenyl, vinyl, 3,3,3-trifluoropropyl, and hydrogen (preferably $R^1$ and $R^2$ are alkyl, with methyl especially preferred); and (b) a polyether segment characterized by a poly(oxyalkylene) group which may be i) in the copolymer backbone or ii) pendent from a siloxane or silane repeating group.

Y copolymers having pendent poly(oxyalkylene) groups along a polysiloxane backbone may be synthesized by incorporating siloxane groups with reactive functionalities into the backbone of the polymer. The siloxane groups may be alkoxylated, esterified or otherwise provided with a poly(oxyalkylene) functionality. Copolymers having a polysiloxane backbone and pendent poly(oxyalkylene) groups are commercially available in the Masil Silicone Surfactants product line, available from PPG Industries, Inc., Gurnee, Ill., USA.

Polysiloxane-polyether copolymers are disclosed in the following patents: Azechi et al. U.S. Pat. No. 5,271,868; Kasprzak et al. U.S. Pat. No. 5,300,667; and Fleuren et al. U.S. Pat. No. 5,376,301. Another method of synthesizing polysiloxane-polyether copolymers is disclosed by Jainlong Ni et al. "Synthesis of a Novel Polysiloxane-based Polymer Electrolyte and its Ionic Conductivity," Polymers for Advanced Technologies Vol. 4, pp 80–84 (1993). Allyl polyethers are grafted onto polysiloxane to form the copolymer. Sela et al., "Newly Designed Polysiloxane-graft-poly (oxyethylene) Copolymeric Surfactants," Colloid PolymSci 272:684–691 (1994) disclose comb grafted surfactants based on a poly(methylhydrogen siloxane)/poly (dimethylsiloxane) block copolymer backbone which is sililated with a vinyl terminated poly(oxyethylene) group.

Alternatively, the polysiloxane-poly(oxyalkylene) copolymer is a block copolymer incorporating a poly (oxyalkylene) substituted silane, e.g., copolymer incorporating silane a group having the structure —Si($R^3$-poly (oxyalkylene)) ($R^4$)—, where $R^3$ is an alkylene group, preferably methylene or ethylene, and $R^4$ is H, alkyl, or phenyl, preferably methyl. Such copolymers are commercially available, for example, the dimethylsiloxane-alkylene oxide copolymers available from Petrarch Systems, Silanes and Silicones Group, Bristol, Pa., USA.

Block copolymers having a poly(oxyalkylene) segment in the backbone may be synthesized by procedures well known in the art, and are commercially available from Dow Corning, Midland, Mich., USA under the 5103 Fluid and Q, e.g., Q2-5211, wetting agent product lines.

Y can also be particularly described as a poly (oxyalkylene)-containing polysiloxane moiety formula selected from the group consisting of $(OSi(R')(R''))_iO$ $(SiR'R'''O(C_aH_{2a}O)_m(C_bH_{2b}O)_n)_j$ and $(OSi(R')(R''))_i(R'''O (C_aH_{2a}O)_m(C_bH_{2b}O)_n)_j$ where R' and R" are each alkyl, preferably C1 to C4 alkyl, more preferably methyl, R''' is alkylene, preferably C1 to C3 alkylene, more preferably ethylene, i and j are integers selected to provide a molecular weight for Y of 300 to 10000, preferably 450 to 5000, more preferably 800 to 1400, i is at least 3, j is at least 1, a and b are different and from 1 to 8, preferably from 1 to 4, more preferably from 2 to 3, m is at least 3, preferably 5 to 15, and n is an integer from 0 to 15 inclusive, preferably 0.

The poly(oxyalkylene)-containing substituent Y has a molecular weight which can range from 300 to 10000, preferably 450 to 5000, more preferably 800 to 1400.

Further description of the polysiloxane poly(oxyalkylene) copolymers useful in the present invention may be found in the Encyclopedia of Polymer Science and Engineering, John Wiley & Sons, Vol. 15, page 234–244 (1989) and the references cited therein.

End Group Z

The end group Z of poly(oxyalkylene)-containing substituent Y is not believed to be critical insofar as the functioning of the colorant is concerned. The end group Z can be any suitable terminal group, e.g., one selected from the group consisting of hydroxyl, alkyl, e.g., $C_1$ to $C_4$ alkyl, amino, amido, alkyl ester, e.g., acetyl, phenyl ester, alkyl ether, alkyl acetal, and BA where Y has a nucleophilic end group (such as where the polysiloxane-poly(oxyalkylene) copolymer is a diamine). The end group can itself contribute to solubility characteristics of the colorant product. Examples of other suitable terminal groups are those disclosed in U.S. Pat. No. 5,270,363 to Kluger, et al, for poly(oxyalkylene) polymers. Where Z is XBA the resulting colorant has the structure ABXYXBA where X, B, and A are as described above.

Colorant Preparation

The colorant compositions used in the present invention can be readily prepared by covalently bonding reactive dye AB (as listed above) to the poly(oxyalkylene)-containing XYZ group by heating an aqueous composition of the copolymer and the dye to a temperature of at least 40° C., preferably at least 60° C. The reaction time will vary according to the temperature employed, i.e., increasing the temperature will increase the rate of reaction. For example, at 85° C., the reaction is complete in two hours. The pH of the reaction composition is maintained to avoid protonating amine if present in the reaction mixture. A molar excess of the poly(oxyalkylene)-containing group XYZ is typically employed to insure complete conversion and to minimize the presence of unreacted and unsubstituted reactive dye, which can cause undesired staining. Acid scavenger such as sodium carbonate is preferably present in the reaction mixture, say, in about equivalent amounts. The poly (oxyalkylene)-substituted colorant of the present invention formed in the reaction composition may be concentrated or diluted as desired for a particular application by evaporation or the addition of water, respectively.

Suitable examples of XYZ reactants from which the present colorant compositions can be prepared include commercially available polyoxyalkyleneamines from the JEFFAMINE® series from Huntsman Chemical and described in Texaco Chemical Company, New Product Development brochures as the M, D, ED, DU, BuD, T, MNPA, and EDR series. These polyoxyalkylene amines contain primary amino groups attached to the terminus of a polyether backbone which can be based on either propylene oxide (PO), ethylene oxide (EO), or mixed EO/PO. The JEFFAMINE® family consists of monoamines, diamines and triamines, which are available in a variety of molecular weights, ranging from 230 to 6000. JEFFAMINE® compounds are designated by letter and number, the latter representing approximate molecular weight. JEFFAMINES® include M-Series (monoamines), D-Series (amine-terminated polypropylene glycols), ED-Series (polyether diamines based on a predominately polyethylene oxide backbone imparting water solubility), DU-Series (urea condensate of D-Series products to provide a diamine product of increased molecular weight which is amine terminated), BuD-Series (urea condensate of D-Series products to provide a urea terminated product), and T-Series (propylene oxide based triamines prepared by reacting PO with a triol initiator, followed by amination of the terminal hydroxyl groups). These amines are further described in U.S. Pat. No. 5,270, 363 to Kluger et al., at columns 7 to 12.

The solubility of the colorant used in the present invention can vary by the relative hydrophilic/oleophilic character of the poly(oxyalkylene) substituent and the end group, as well as the presence or absence of ionic groups on the organic chromophore. Preferably, the present colorant compositions are soluble in polar solvent, e.g., methanol and water. In particular, the present colorant compositions are greater than: 10%, 25%, 50%, or even 90% soluble in cold water.

The invention may be further understood by reference to the following examples, but is not intended to be unduly limited thereby.

General Reaction Conditions for Preparation of Poly (oxyethylene)-Substituted Colorant One equivalent of reactive dyestuff was mixed with 5–10% molar excess of nucleophilic polymer, one equivalent of sodium carbonate (or other suitable acid scavenger), and enough water to afford mixing. The reaction mixture was then heated to 80 °–100° C. for 2–4 hrs. and the resultant solution then phase separated. The concentrated polymeric colorant phase was then brought to a neutral pH and further diluted with water if desired.

EXAMPLE 1

25 gm of C.I. Reactive Blue 19 (25%) were mixed with 7.2 gm of JEFFAMINE® M-715 and 1.1 gm of sodium carbonate. The mixture was heated to 85° C. for two hours. The concentrated polymeric colorant was phased from the salt phase and diluted with water.

EXAMPLE 2

62.8 gm of C.I. Reactive Blue 19 (50%) were mixed with 66.2 gm of Fluid Q4-3667 (poly(oxyethylene-dimethylsiloxane)copolymer) available from Dow Corning, Midland, Mich., 3 gm of sodium carbonate, and 100 gm water. The mixture was heated to 85° C. for two hours. The concentrated polymeric colorant was then diluted with water.

EXAMPLE 3

61.6 gm of C.I. Reactive Red 2 (50%) were mixed with 146.8 gm of Fluid Q4-3667 (poly(oxyethylene-dimethylsiloxane)copolymer), 5.8 gm of sodium carbonate, and 100 gm water. The mixture was heated to 85° C. for two hours. The concentrated polymeric colorant was then diluted with water.

EXAMPLE 4

6.2 gm of C.I. Reactive Red 2 were mixed with 14.3 gm of JEFFAMINE® M-715 and 1.1 gm of sodium carbonate, and 25 gm water. The mixture was heated to 85° C. for two hours. The concentrated polymeric colorant was then diluted with water.

EXAMPLE 5

5.9 gm of C.I. Reactive Yellow 3 were mixed with 7.2 gm of JEFFAMINE® M-1000, 1.1 gm of sodium carbonate, and 25 gm water. The mixture was heated to 85° C. for two hours. The concentrated polymeric colorant was phased from the salt phase and diluted with water.

The above colorants were incorporated into various surface cleaner products as follows:

Colorant was added for aesthetic purposes to a generic hard surface cleaner solution so that the resulting Absorbance of the solution was about 1 Abs/gm·cm/L. The generic hard surface cleaner was made from Neodol® 91-6 (8%) available from Shell Chemical Co. of Houston, Tex., sodium metasilicate, pentahydrate (11.1%), EDTA (9.6%), dicarboxylic organic acid (8%), and water (63.3%). The pH of this product was 12.5 so that any chromophore employed should be highly pH stable. The generic hard surface cleaner was initially dark, suggesting the use of several chromophores to overcome the initial color.

Colorant was added for aesthetic purposes to a generic floor cleaner solution so that the resulting Absorbance of the solution was about 1 Abs/gm·cm/L. The generic floor cleaner was made from Neodol® 91-6 (10%), oleic acid (5%), MEA (monoethanolamine) (5%), tetrapotassium pyrophosphate (5%), and water (75%). The pH of this product was 11.6 so that any chromophore employed should be highly pH stable.

Colorant was added for aesthetic purposes to a generic glass cleaner solution so that the resulting Absorbance of the solution was about 1 Abs/gm·cm/L. The generic glass cleaner was made from Neodol® 25-7 (0.1%), isopropanol (15%), and water (84.9%). The lightfastness of copper phthalocyanines and triphenylmethane chromophores is poor in this environment.

Colorant was added for aesthetic purposes to a straw-colored generic light duty liquid dishwashing detergent solution so that the resulting Absorbance of the solution was about 1 Abs/gm·cm/L. The light duty liquid detergent solution was made from Biosoft D-40, obtained from Stepan Co. of Northfield, Ill. (46.4%), Stepanate SXS, 40%, obtained from Stepan Co. (8.8%), Steol CS-460, obtained from Stepan Co. (18.9%), Ninol 149 CE, obtained from Stepan Co. (4.1%), NaCl (3.1%), and water (18.8%).

The colored cleaner composition samples were stain tested by measuring the delta E of a 13-fiber test fabric available from Test Fabrics Co. of Middlesex, N.J. on a Hunter Labscan available from Hunter Corp. of Reston, Va. before staining, after staining, and after washing. The 13-fiber test fabric was immersed into the colorant solution and allowed to soak for about 15 minutes. The test fabric was then air dried at least 12 hours and then rinsed with cold tap water until no bleeding of color occurred upon standing and then allowed to air dry. % Color washed out was calculated as the ratio of the difference in delta E after staining and after washing to the delta E after staining. The results (% color washed out) are provided in the Tables below.

5 Hour Xenon Lightfastness was tested by placing the dyed hard surface cleaner composition in a sealed test tube and exposing to 5 hours of xenon arc irradiation using an Atlas Weatherometer, available from Atlas Electric Devices Company, Chicago, Ill. The delta E of the test solution was measured on a Spectro-Sensor II colorimeter, available from Datacolor International, Charlotte, N.C. before coloration and before and after irradiation. % Color Retained was calculated as the ratio of the difference in delta E after irradiation and before irradiation to the delta E before irradiation.

2 Week Stability at 49° C. (120° F.) was measured by placing in an oven the dyed surface cleaner composition in a sealed test tube and exposing to a temperature of 49° C. (120° F.) for two weeks. The delta E of the test solution was measured on the Spectro-Sensor II colorimeter before coloration and before and after heating. % Color Retained was calculated as the ratio of the difference in delta E after heating and before heating to the delta E before heating. (% Color Retained).

The surface cleaner compositions of the present invention were compared with those containing the corresponding reactive dyes (Reactive Blue 19, Reactive Red 2, and Reactive Yellow 3) as well as with conventional dyes and polymeric colorants, i.e. Acid Blue 80, Lt. Blue HP, Acid Red 1, Lt. Red RL, D&C Yellow 10, Lt. Sunbeam Yellow and Lt. Yellow LP. The results show that the colorants employed in the present invention provide similar or improved lightfastness over the corresponding reactive dyes and generally equivalent or improved lightfastness over conventional surface cleaner composition dyes.

The results of the 5 Hour Xenon Lightfastness, Fiber Staining (Cotton, Nylon, Silk) (% washed out) and Two Week Stability at 49° C. (% color retained) are set out in Table 1 for hard surface cleaner composition, Table 2 for floor cleaner/wax stripper composition, Table 3 for generic glass cleaner composition, and Table 4 for light duty liquid dishwashing detergent.

TABLE 1

| Colorant | 5 Hr Xenon Lightfastness (% Color Retained) | Fiber Staining (Cotton, Nylon, Silk) (% Washed Out) | 2 Week Stability at 49° C. (% Color Retained) |
|---|---|---|---|
| EX. 1 REACTIVE BLUE 19 + JEFFAMINE ® M-715 | 80 | 96, 96, 93 | 98 |
| EX. 2 REACTIVE BLUE 19 + Fluid Q4-3667 | 79 | 96, 99, 92 | 97 |
| REACTIVE BLUE 19 | 76 | 93, 92, 96 | 96 |
| ACID BLUE 80 | 91 | 91, 90, 95 | 109 |
| LT. BLUE HP | 64 | 91, 91, 80 | 97 |
| EX. 3 REACTIVE RED 2 + Fluid Q4-3667 | 43 | 93, 97, 95 | 96 |
| EX. 4 REACTIVE RED 2 + JEFFAMINE ® M-715 | 25 | 95, 96, 91 | 102 |
| REACTIVE RED 2 | 47 | 93, 95, 96 | 97 |
| ACID RED 1 | 41 | 93, 92, 94 | 72 |
| LT. RED RL | 37 | 94, 92, 92 | 88 |
| EX. 5 REACTIVE YELLOW 3 + JEFFAMINE ® M-715 | 73 | 95, 92, 96 | 70 |
| REACTIVE YELLOW 3 | 72 | 77, 93, 92 | 78 |
| D & C YELLOW 10 | 27 | 90, 85, 91 | 112 |
| LT. SUNBEAM YELLOW | 107 | 94, 95, 93 | 84 |
| LT. YELLOW LP | 5 | 69, 71, 83 | 0 |

TABLE 2

| Colorant | 5 Hr Xenon Lightfastness (% Color Retained) | Fiber Staining (Cotton, Nylon, Silk) (% Washed Out) | 2 Week Stability at 49° C. (% Color Retained) |
|---|---|---|---|
| EX. 1 REACTIVE BLUE 19 + JEFFAMINE ® M-715 | 78 | 96, 96, 93 | 72 |
| EX. 2 REACTIVE BLUE 19 + Fluid Q4-3667 | 64 | 96, 99, 92 | 69 |
| REACTIVE BLUE 19 | 73 | 94, 98, 92 | 76 |
| ACID BLUE 80 | 94 | 94, 97, 93 | 91 |
| LT. BLUE HP | 90 | 97, 96, 79 | 83 |
| EX. 3 REACTIVE RED 2 + Fluid Q4-3667 | 75 | 93, 97, 95 | 34 |
| EX. 4 REACTIVE RED 2 + JEFFAMINE ® M-715 | 92 | 95, 96, 91 | 38 |
| REACTIVE RED 2 | 73 | 93, 95, 96 | 22 |
| ACID RED 1 | 81 | 97, 97, 97 | 37 |
| LT. RED RL | 51 | 94, 95, 89 | 6.4 |
| EX. 5 REACTIVE YELLOW 3 + JEFFAMINE ® M-715 | 101 | 95, 92, 96 | 32 |
| REACTIVE YELLOW 3 | 99 | 80, 91, 96 | 26 |
| D & C YELLOW 10 | 77 | 97, 96, 95 | 104 |
| LT. SUNBEAM YELLOW | 87 | 95, 98, 94 | 66 |
| LT. YELLOW LP | 8 | 94, 96, 93 | 0 |

TABLE 3

| Colorant | 5 Hr Xenon Lightfastness (% Color Retained) | 13 Fiber Staining (Cotton, Nylon, Silk) (% Washed Out) | 2 Week Stability at 49° C. (% Color Retained) |
|---|---|---|---|
| EX. 1 REACTIVE BLUE 19 + JEFFAMINE ® M-715 | 100 | 88, 68, 38 | 99 |
| EX. 2 | 94 | 67, 46, 11 | 100 |

TABLE 3-continued

| Colorant | 5 Hr Xenon Lightfastness (% Color Retained) | 13 Fiber Staining (Cotton, Nylon, Silk) (% Washed Out) | 2 Week Stability at 49° C. (% Color Retained) |
|---|---|---|---|
| REACTIVE BLUE 19 + Fluid Q4-3667 | | | |
| REACTIVE BLUE 19 | 100 | 78, 64, 38 | 98 |
| ACID BLUE 80 | 100 | 54, 81, 11 | 100 |
| LT. BLUE HP | 99 | 80, 43, 8 | 100 |
| EX. 3 | 100 | 74, 89, 49 | 100 |
| REACTIVE RED 2 + Fluid Q4-3667 | | | |
| EX. 4 | 100 | 86, 90, 77 | 99 |
| REACTIVE RED 2 + JEFFAMINE ® M-715 | | | |
| REACTIVE RED 2 | 87 | 50, 64, 7 | 99 |
| ACID RED 1 | 93 | 95, 79, 65 | 99 |
| LT. RED RL | 99 | 89, 72, 17 | 99 |
| EX. 5 | 117 | 91, 84, 77 | 108 |
| REACTIVE YELLOW 3 + JEFFAMINE ® M-715 | | | |
| REACTIVE YELLOW 3 | 108 | 51, 58, 68 | 105 |
| D & C YELLOW 10 | 99 | 82, 26, 26 | 100 |
| LT. SUNBEAM YELLOW | 96 | 95, 78, 70 | 86 |
| LT. YELLOW LP | 93 | 84, 97, 63 | 16 |

TABLE 4

(% Color Washed Out)

| | Blue 19 | Ex. 1 | Ex. 3 | Red 2 | Ex. 5 | Yellow 3 |
|---|---|---|---|---|---|---|
| Acetate | 95.97 | 96.22 | 97.17 | 96.43 | 92.51 | 92.45 |
| SEF | 98.75 | 98.98 | 99.25 | 98.55 | 99.05 | 99.02 |
| Arnel ® (Bright) | 97.19 | 97.58 | 98.05 | 97.57 | 97.63 | 91.61 |
| Bleached Cotton | 96.06 | 95.80 | 93.01 | 92.01 | 96.87 | 85.30 |
| Creslan ® 61 | 96.48 | 95.30 | 96.98 | 97.03 | 94.66 | 95.34 |
| Dacron ® 54 | 95.31 | 96.46 | 93.33 | 95.89 | 93.60 | 93.20 |
| Dacron ® 64 | 95.70 | 93.89 | 90.72 | 96.11 | 93.82 | 93.93 |
| Nylon ® 6,6 | 93.60 | 94.27 | 90.92 | 94.74 | 91.78 | 94.47 |
| Orlon ® 75 | 97.28 | 96.10 | 96.07 | 96.31 | 95.43 | 95.42 |
| Spun Silk | 92.20 | 94.81 | 92.29 | 90.25 | 97.34 | 89.99 |
| Polypropylene | 93.12 | 92.74 | 93.32 | 93.33 | 90.54 | 90.55 |
| Viscose ® | 96.62 | 96.96 | 96.74 | 96.59 | 95.64 | 98.07 |
| Wool | 95.20 | 96.46 | 96.61 | 96.02 | 95.90 | 94.45 |
| Average | 95.65 | 95.81 | 95.96 | 95.45 | 94.98 | 93.37 |

There are of course, many alternate embodiments and modifications of the invention which are intended to be included within the scope of the following claims.

It is claimed:

1. A surface cleaner composition comprising:
   a) from 0.1 to 70% of tensoactive, or mixtures thereof;
   b) from 0 to 95% builder/softener;
   c) from 0 to 99.9% solvent;
   d) from 0 to 50% hydrotrope; and
   e) from 1 ppm to 5000 ppm of a poly(oxyalkylene)-substituted colorant which is liquid in its undiluted state having the structure ABXYZ, where
   AB is a reactive dye moiety wherein
   A is an organic chromophore, and
   B is an electrophilic group covalently bonded to A directly or through a linking group;
   X is a nucleophilic linking group covalently bonding B and Y, selected from the group consisting of NR, O, S, and 4-oxyanilino (—HN—Ph—O); where R is selected from the group consisting of H, alkyl, aryl, and YZ;
   Y is a poly(oxyalkylene)-containing moiety; and
   Z is a terminal group for Y.

2. The composition of claim 1 wherein
   A is an organic chromophore selected from the group consisting of azo, phthalocyanine, anthraquinone, aza [18] annulene, formazan copper complex, nitroso, nitro, diarylmethane, triarylmethane, xanthene, acridene, methine, thiazole, indamine, azine, oxazine, thiazine, quinoline, indigoid, indophenol, lactone, aminoketone, hydroxyketone, and stilbene chromophores;
   B is an electrophilic reactive group selected from the group consisting of monohalotriazine, dihalotriazine, monohalopyrimidine, dihalopyrimidine, trihalopyrimidine, dihaloquinoxaline, dihalopyridazone, dihalophthalazine, halobenzothiazole, amino epoxide, methylamino, sulfatoethyl sulfone, sulfatoethyl sulfonamide, chloroethyl sulfone, vinyl sulfone, phenylamino sulfone, alpha-haloacryloylamide, alpha, beta-dihalopropionyl amide, halosulfonyl pyrimidine, sulfatoethylamino sulfone, sulfatopropionamide, halosulfothiazinylamide, and haloacetylamide, covalently bonded to A directly through a linking group;
   Y comprises an element selected from the group consisting of
   i) $(C_aH_{2a}O)m(C_bH_{2b}O)_n$ where a and b are different and from 1 to 9, m is at least 3, n is 0 to 15; and
   ii) poly(oxyalkylene)-containing polysiloxane; and
   Z is a terminal group of Y, selected from the group consisting of hydroxyl, alkyl, amino, amido, alkyl ester, phenyl ester, alkyl ether, alkyl acetal, and BA where Y has a nucleophilic end group.

3. The composition of claim 2 wherein said poly(oxyalkylene)-containing polysiloxane is a polysiloxane-poly(oxyalkylene) copolymer having a backbone and a molecular weight of 300 to 10000 which comprises:

(a) a polysiloxane segment characterized by a —Si($R^1$)($R^2$)O— repeating group wherein $R^1$ and $R^2$ are each selected from the group consisting of alkyl, phenyl, vinyl, 3,3,3-trifluoropropyl, and hydrogen; and (b) a polyether segment characterized by a poly(oxyalkylene) group which is i) in the copolymer backbone or ii) pendent from a siloxane or silane repeating group, said poly(oxyalkylene) group comprising 5 to 95% of Y.

4. The composition of claim 3 wherein Y comprises a poly(oxyalkylene)-containing polysiloxane moiety formula selected from the group consisting of $(OSi(R')(R''))iO(SiR'R'''O(C_aH_{2a}O)_m(C_bH_{2b}O)_n)_j$ and $(OSi(R')(R''))i(R'''O(C_aH_{2a}O)_m(C_bH_{2b}O)_n)_j$ where R' and R" are each alkyl, R''' is alkylene, i and j are integers selected to provide a molecular weight for Y of 300 to 10000, i is at least 3, j is at least 1, a and b are different and from 1 to 8, m is at least 3, and n is from 0 to 15.

5. The composition of claim 2 wherein

A is selected from the group consisting of azo, phthalocyanine and anthraquinone chromophores;

B is selected from the group consisting of monochlorotriazine, dichlorotriazine, monofluorotriazine, sulfatoethylsulfone, vinyl sulfone, 2,3-dichloroquinoxaline and 2,4-difluor-5-chloropyrimidine;

X is NR where R is selected from the group consisting of H, alkyl, aryl, and YZ; and Z is a terminal group for Y, selected from the group consisting of OH, $C_1$ to $C_4$ alkyl, acetyl, amino, and amido.

6. The composition of claim 5 wherein

A is anthraquinone;

Y is a poly(oxyalkylene)-containing moiety comprising the formula $(C_aH_{2a}O)_m(C_bH_{2b}O)_n$ where a is 2, b is 3; and Z is selected from the group consisting of OH and amino.

7. The composition of claim 4 wherein R' and R" are each methyl, a is 2, b is 3, and n is at least 1.

8. The composition of claim 4 wherein R' and R" are each methyl, a is 2, and n is 0.

9. The composition of claim 4 wherein R' and R" are each methyl, a is 3, and n is 0.

10. The composition of claim 2 wherein AB is selected from the group consisting of C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I., Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C.I. Reactive Yellow 17, and C.I. Reactive Yellow 95; and Y has a molecular weight ranging from 300 to 10,000.

11. The composition of claim 2 wherein AB is selected from the group consisting of C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, and wherein Y has a molecular weight ranging from 450 to 5,000.

12. The composition of claim 11 wherein AB is selected from the group consisting of C.I. Reactive Blue 19, C.I. Reactive Red 2, and C.I. Reactive Yellow 3.

13. The composition of claim 1 which is a hard surface cleaner composition comprising:

a) from 2 to 60% of tensoactive, or mixtures thereof;

b) from 0 to 40% builders;

c) from 0 to 35% builder/softener;

d) from 0 to 50% hydrotrope; and e) from 1 ppm to 5000 ppm of said poly(oxyalkylene)-substituted colorant which is liquid in its undiluted state having the structure ABXYZ.

14. The composition of claim 1 which is a hard surface cleaner composition comprising:

a) from 1 to 20% of tensoactive, or mixtures thereof;

b) from 0 to 35% builder/softener;

c) from 0 to 40% solvent;

d) from 0 to 10% hydrotrope; and e) from 1 ppm to 5000 ppm of said poly(oxyalkylene)-substituted colorant which is liquid in its undiluted state having the structure ABXYZ.

15. The composition of claim 1 which is a glass/window cleaner formulation comprising:

from 0.1 to 15% of tensoactive, or mixtures thereof.

16. The composition of claim 1 which is a bathroom cleaner formulation comprising:

a) from 1 to 20% of tensoactive, or mixtures thereof;

b) from 0 to 15% builder/softener;

c) from 0 to 10% solvent;

d) from 0 to 20% hydrotrope; and e) from 1 ppm to 5000 ppm of said poly(oxyalkylene)-substituted colorant which is liquid in its undiluted state having the structure ABXYZ.

17. The composition of claim 1 which is a light duty liquid dishwashing detergent formulation comprising:

a) from 5 to 70% of tensoactive, or mixtures thereof;

b) from 0 to 15% builder/softener;

c) from 0 to 10% hydrotrope; and d) from 1 ppm to 5000 ppm of said poly(oxyalkylene)-substituted colorant which is liquid in its undiluted state having the structure ABXYZ.

18. The composition of claim 1 which is an automatic dishwashing detergent formulation comprising:

a) from 0.1 to 10% of tensoactive, or mixtures thereof;

b) from 5 to 90% builder/softener;

c) from 1 to 40% silicate; and d) from 1 ppm to 5000 ppm of said poly(oxyalkylene)-substituted colorant which is liquid in its undiluted state having the structure ABXYZ.

* * * * *